United States Patent [19]
Tanaka et al.

[11] Patent Number: 5,926,603
[45] Date of Patent: Jul. 20, 1999

[54] VIDEO SIGNAL EDITING APPARATUS IN WHICH MULTIPLE VIDEO CLIP EDIT FRAMES ARE SIMULTANEOUSLY DISPLAYED ON ONE MONITOR

[75] Inventors: Toshiyuki Tanaka; Sojiro Kizu; Takashi Tabuchi; Akira Kikuchi; Yutaka Saito, all of Kanagawa, Japan

[73] Assignee: Sony Corporation, Tokyo, Japan

[21] Appl. No.: 08/692,879

[22] Filed: Aug. 1, 1996

Related U.S. Application Data

[63] Continuation of application No. 08/224,736, Apr. 8, 1994, abandoned.

[30] Foreign Application Priority Data

| Apr. 13, 1993 | [JP] | Japan | 5-086386 |
| Apr. 14, 1993 | [JP] | Japan | 5-087413 |
| Apr. 14, 1993 | [JP] | Japan | 5-087414 |
| Apr. 14, 1993 | [JP] | Japan | 5-087415 |
| Apr. 14, 1993 | [JP] | Japan | 5-087416 |

[51] Int. Cl.$^6$ ............................................. H04N 5/93
[52] U.S. Cl. ............................. 386/53; 386/52; 386/108; 386/65
[58] Field of Search ........................... 360/33.1, 13, 14.1, 360/14.2; 358/335, 311; 386/52, 53, 55, 61, 62, 64, 65, 92, 108, 4, 95

[56] References Cited

U.S. PATENT DOCUMENTS

| 3,617,626 | 11/1971 | Bluth et al. . | |
| 4,858,011 | 8/1989 | Jackson et al. | 358/181 |
| 4,979,050 | 12/1990 | Westland et al. | 360/14.1 |
| 5,103,348 | 4/1992 | Sasho et al. | 360/14.1 |
| 5,119,474 | 6/1992 | Beitel et al. | 395/154 |
| 5,191,645 | 3/1993 | Carlucci et al. | 395/159 |
| 5,237,648 | 8/1993 | Mills et al. | 395/133 |
| 5,404,316 | 4/1995 | Klingler et al. | 364/514 |

FOREIGN PATENT DOCUMENTS

| 0438299 | 7/1991 | European Pat. Off. . |
| 0526064 | 2/1993 | European Pat. Off. . |
| 0564247 | 10/1993 | European Pat. Off. . |
| WO9403897 | 2/1994 | WIPO . |

OTHER PUBLICATIONS

"Non–linear Off–Line Editing for HDTV and Film" by T. Mann in Image Technology (Journal of the BKSTS), vol. 17, No. 12, Dec. 1989, pp. 541–546 (London, GB).

"Videobearbeitung am PC" in *Radio Fernsehen Elektronik*, vol. 42, No. 2, Feb. 1993, pp. 16–19 (Berlin, DE).

*Primary Examiner*—Andrew L. Sniezek
*Attorney, Agent, or Firm*—Jay H. Maioli

[57] ABSTRACT

An editing apparatus forms an output video signal by effecting an editing processing on a plurality of video signals effect on first and second input video signals. There are generated first and second video clips representing a starting position and an ending position set to the first input video signal, third and fourth video clips representing a starting position and an ending position set to a second input video signal, and fifth and sixth video clips representing a starting position and an ending position set to an output video signal. The first, second, third and fourth video clips are displayed on the basis of time information attached to each video clip so as to express a positional relationship of the first, second, third and fourth video clips on a time axis. Also, the fifth and sixth video clips are displayed.

6 Claims, 13 Drawing Sheets

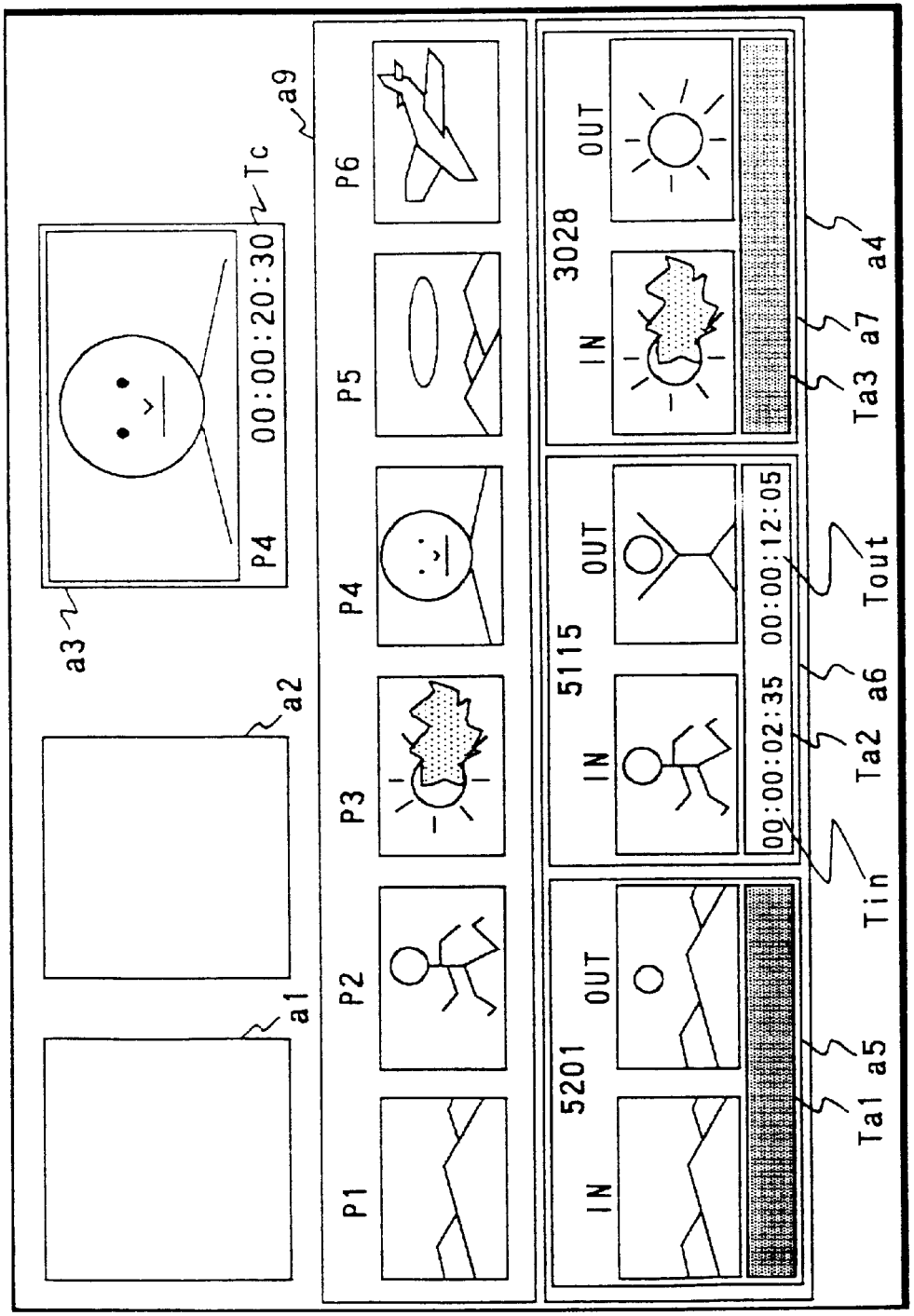

VIDEO SIGNAL EDITING APPARATUS IN WHICH MULTIPLE VIDEO CLIP EDIT FRAMES ARE SIMULTANEOUSLY DISPLAYED ON ONE MONITOR

This is a continuation of application Ser. No. 08/224,736 filed Apr. 8, 1994 now abandoned.

BACKGROUND OF THE INVENTION

1. Field of the Invention

The present invention relates to an editing apparatus for use in editing a video signal, for example.

2. Description of the Prior Art

Heretofore, U.S. Pat. No. 5,103,348 describes an editing apparatus. Also, there is proposed an editing apparatus which will be described below with reference to FIG. 1 of the accompanying drawings. As shown in FIG. 1, this conventional editing apparatus is comprised of VTRs (video tape recorders) 2, 3, an editor 1 for previously fine adjusting and controlling the VTRs 2, 3 and a VTR 6 for recording video signals from the VTRs 2, 3 in various manners before editing, a switcher 4 for selecting the video signals supplied thereto from the VTRs 2, 3, a DME (digital multi-effector) 5 for effecting various video special effects on the video signal supplied thereto from the switcher 4 and supplying the thus processed video signal back to the switcher 4 and the VTR 6 for recording the video signal from the switcher 4.

A fundamental processing of the conventional editing apparatus thus arranged as shown in FIG. 1 will be described below. The user can select where to use a material recorded on a video tape cassette set on the VTR 2 and a material recorded on a video tape cassette set on the VTR 3 or how to use the material of the video tape cassette set on the VTR 2 or the material of the video cassette tape on the VTR 3 while checking a menu picture displayed on a picture screen of a monitor 1A of the editor 1. The material of the VTR 2 will be referred hereinafter to as "roll A", and that of the VTR 3 will be referred hereinafter to as "roll B", respectively.

Further, the user can designate where to use the material of the roll A and the material of the roll B by inputting time codes or by designating time codes supplied thereto from the VTR 2 or 3 upon playback as an in-point IN and an out-point OUT when the user carries out a suitable operation, such as a depression of a switch or the like. The in-point IN represents a time code of the first image of the material to be used, and the out-point OUT represents a time code of the last image of the material to be used.

The switcher 4 processes the video signals supplied thereto from the VTRs 2 and 3 in some suitable transition processing fashion, such as wipe, dissolve, etc. Further, the DME 5 (or switcher 4) effects some suitable processing, such as a designation of a processing on a time base, which will be referred to as a time line, or the like on the video signals supplied thereto, whereafter the video signal thus processed is recorded on the VTR 6 or previewed (i.e.., video signal thus processed is reproduced without being recorded).

The time line is used to obtain a video signal effect by designating some video special effect elements, such as a trajectory for drawing a curve on an image, a twist of an image or the like.

Operation of the editing apparatus shown in FIG. 1 will be described with reference to FIGS. 2A through 2G. In this description of operation, let us assume that the switcher 4 processes a material Va recorded on the video tape cassette set on the VTR 2 and a material Vb recorded on the video tape cassette set on the VTR 3 in a transition processing fashion to output one video signal and that this outputted video signal is recorded by the VTR 6 or displayed on the monitor 1A of the editor 1.

As shown in FIGS. 2A and 2B, of the material of the video tape cassette set on the VTR 2 shown in FIG. 1, the user can designate the material Va by designating the in-point IN and the out-point OUT. On the other hand, of the material of the video tape cassette set on the VTR 3 shown in FIG. 1, the user can also designate the material Vb by designating the in-point IN and the out-point OUT.

Under the control of the editor 1, the VTR 2 is set in the playback mode so that the material Va is supplied to the switcher 4 and processed by the DME 5 variously. Then, the video signal thus processed is supplied to and recorded by the VTR 6 or displayed on the picture screen of the monitor 1A of the editor 1 as an image. While constantly monitoring the time codes from the VTR 2, the editor 1 reads a time code provided a little before the time code of the out-point OUT of the material Va and causes the VTR 3 to operate in the playback mode. The material Vb from the VTR 3 is supplied to the switcher 4.

The switcher 4 switches the materials Va, Vb on the basis of a previously-set transition and supplies the material Vb to the DME 5. The material Vb supplied to the DME 5 is processed by the DME 5 in various processing manners and then fed back to the switcher 4. The switcher 4 supplies the material Vb supplied thereto from the DME 5 to the VTR 6. The material Vb supplied to the VTR 6 is recorded by the VTR 6.

For simplicity, various processing manners that can be considered when two materials are collected as one material by a transition processing, reviewed or recorded, such as pre-roll, post-roll, reading of time code, to generate time codes by the editor 1 or the like, need not be described herein and a processing based on the simplest manner will be described hereinafter.

Since the processing is made as described above, the material Va supplied from the VTR 2 is recorded on a magnetic tape along a time base in the video cassette tape set on the VTR 6 as shown in FIG. 2C, and then the material Vb supplied from the VTR 3 is recorded thereon. Therefore, in the preview mode, similarly to the reproduced signal which is played back from this magnetic tape, the material Va is displayed on the picture screen of the monitor 1A of the editor 1 and changed into the material Vb in the form of a designated transition, whereafter the material Vb is displayed on the picture screen of the monitor 1A of the editor 1.

When the materials Va and Vb are both recorded on the video tape cassette set on the VTR 2 as shown in FIG. 2D, the material Vb (or Va) is reproduced by the VTR 2 and recorded on the video tape cassette set on the VTR 3. Then, as shown in FIGS. 2E and 2F, the material Va is reproduced by the VTR 2 in a similar processing fashion, and then the material Vb (previously dubbed from the VTR 3) is reproduced by the VTR 3. These materials Va, Vb are recorded by the VTR 6.

Thus, the material Va supplied from the VTR 2 is recorded along a time axis on a magnetic tape of the video tape cassette set on the VTR 6 and then the material Vb supplied from the VTR 3 is recorded thereon as shown in FIG. 2G. Accordingly, during the preview mode, similarly to the reproduced signal obtained by reproducing this magnetic tape, the material Va is displayed on the picture screen of the monitor 1A of the editor 1 and changed into the material Vb in the form of the designated transition, whereafter the material Vb is displayed on the picture screen of the monitor 1A of the editor 1.

According to the above-mentioned conventional editing apparatus, when the user wants to confirm the whole edit processing along the time axis while any edit processing is carried out, the user must watch time codes of respective materials to be edited or the user must make a note of each edit processing. There is then the disadvantage that the edit processing cannot be controlled satisfactorily along the time axis.

OBJECTS AND SUMMARY OF THE INVENTION

It is therefore an object of the present invention to provide an editing apparatus in which the aforesaid shortcomings and disadvantages encountered with the prior art can be eliminated.

More specifically, it is another object of the present invention to provide an editing apparatus in which a plurality of cues existing in an editing process can be controlled on a time axis with ease.

In order to achieve the aforesaid objects, according to the present invention, there is provided an editing apparatus which makes an output video signal by effecting an editing processing on a plurality of video signals. An output video signal is obtained by effecting a video special effect processing on first and second input video signals. There are generated first and second video clips representing a starting position and an ending position set to the first input video signal, third and fourth video clips representing a starting position and an ending position set to the second input video signal and fifth and sixth video clips representing a starting position and an ending position set to the output video signal. The first, second, third and fourth video clips are displayed on the basis of time information added to each video clip so as to express a positional relationship of the first, second, third and fourth video clips on a time axis. Also, the fifth and sixth video clips are displayed.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 13 is a schematic diagram used to explain display operation of video clips in the editing apparatus shown in FIG. 3.

DETAILED DESCRIPTION OF THE PREFERRED EMBODIMENT

Figure 1:
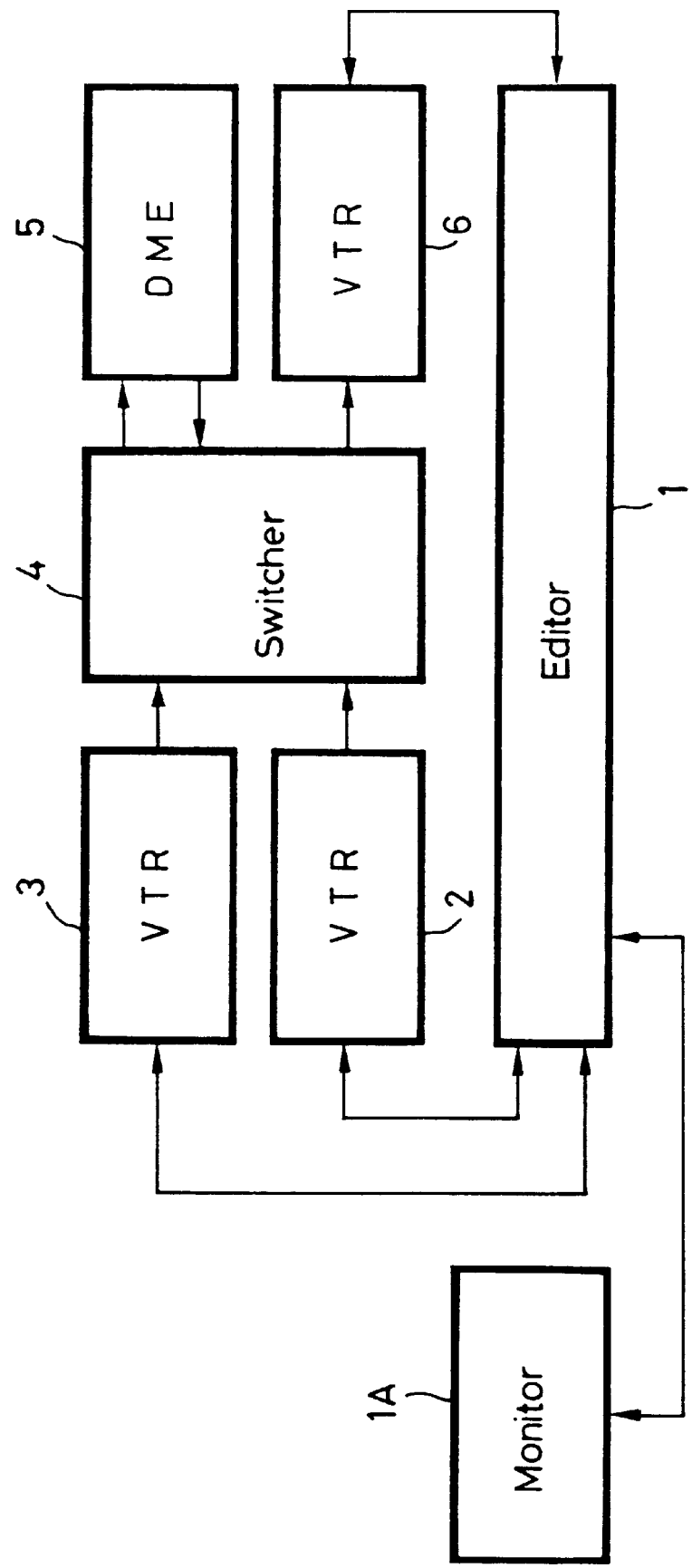
FIG. 1 is a block diagram showing an example of a conventional editing apparatus.

Referring to the drawings in detail, and initially to FIG. 3, an editing apparatus according to an embodiment of the present invention will be described in detail hereinafter.

Figure 3:
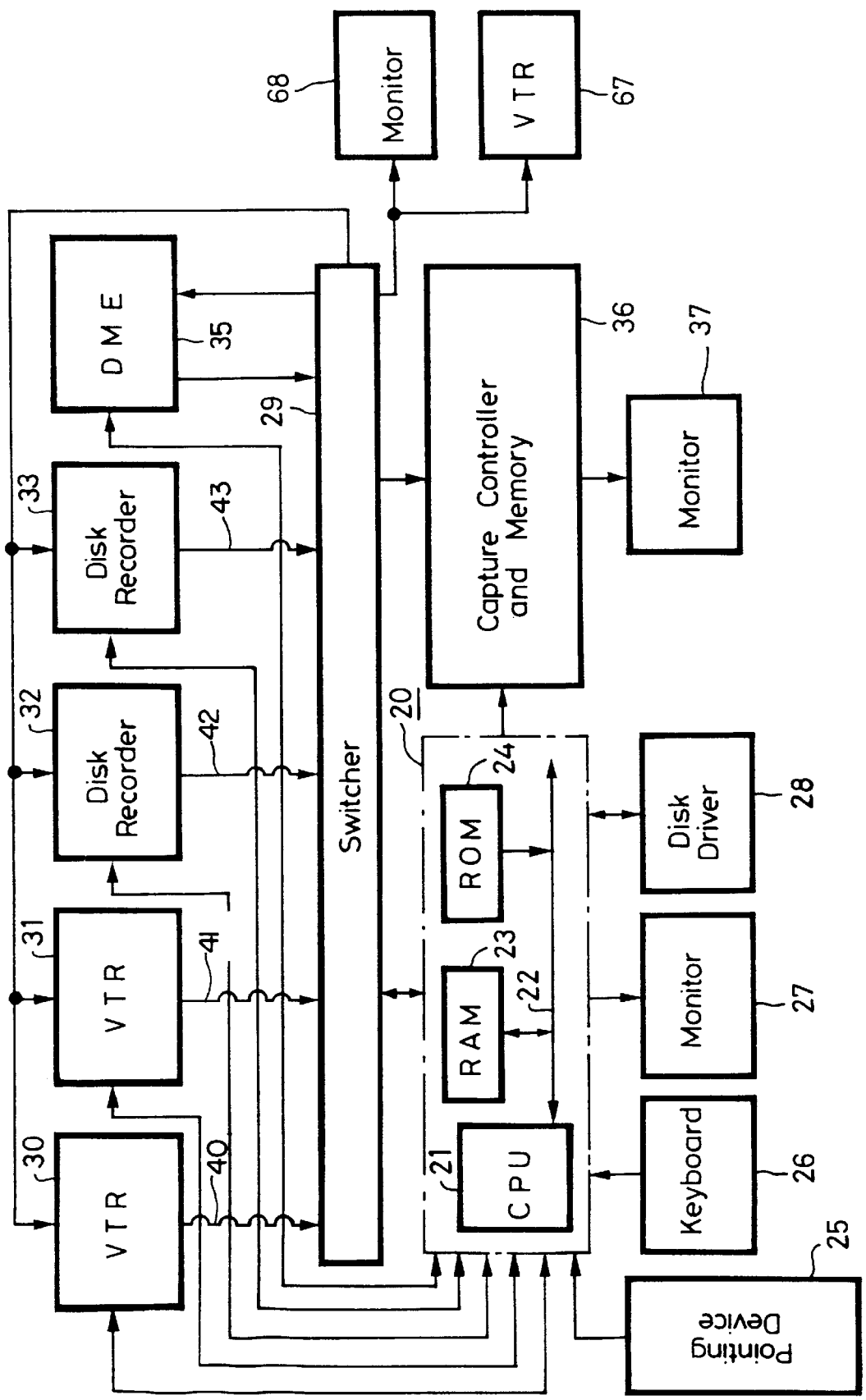
FIG. 3 is a block diagram showing an editing apparatus according to an embodiment of the present invention.

As shown in FIG. 3, there is provided a control apparatus 20 which controls respective apparatus that are used to edit a video signal and an audio signal. As shown in FIG. 3, a fundamental portion of the control apparatus 20 is comprised of a CPU (central processing unit) 21, a bus (formed of address bus, control bus and data bus) 22, a RAM (random access memory) 23 for work area and a ROM (read only memory) 24 in which there is memorized program data which will be described later on. Accordingly, various ports and extension boards (memories, etc.) can, of course, be prepared or extended separately, though not shown.

The control apparatus 20 includes a pointing device 25, such as a mouse, a track ball or the like, a keyboard 26 for operating the editing apparatus, a monitor 27, a disk driver 28, such as a hard disk apparatus which can be made freely detachable from the body unit, a silicon disk apparatus, a magneto-optical disk apparatus, a floppy disk apparatus or the like, connected thereto.

The control apparatus 20 controls VTRs 30, 31 and disk recorders 32, 33, such as a mass-storage hard disk apparatus including hard disk apparatus that is freely detachable from the body unit of the editing apparatus, a mass-storage silicon disk apparatus, a magneto-optical disk apparatus or the like, through a control interface, such as an RS-422 interface or the like.

The control apparatus 20 controls the VTRs 30, 31 and the disk recorders 32, 33 by transmitting effect information, cut information (dubbing), transition information, such as mix, wipe or the like, key information and a time code signal representing an address of video signal according to the interface format, such as the RS-422 interface or the like. Also, the control apparatus 20 controls switching of switcher 29, such as mix, wipe and keys or various special effects of the DME (digital multi-effector) 35.

The control apparatus 20 further controls the switcher 29 for switching video signals from the VTRs 30, 31 and the disk recorders 32, 33 and processing these video signals in a transition processing fashion, such as mix, wipe or the like, the DME 35 for processing the video signal supplied thereto from the switcher 29 in some suitable signal processing fashion, such as deform or the like, and a capture controller and memory 36 for compressing (e.g., decimating or the like) video signals supplied thereto from the switcher 29 on the basis of its control signal as a video clip of a frame picture therefrom and memorizing the same. The capture (i.e., used to capture image data) controller and memory 36 includes a mass-storage memory (e.g., RAM) and a compression circuit to thereby compress video signals supplied thereto from the switcher 29 or to memorize a video signal designated by the in-point IN and the out-point OUT together with an offset amount, as will be described later on.

Video signal output terminals of the switcher 29 are connected to video signal input terminals of the VTRs 30, 31 and the disk recorders 32, 33. Video signal output terminals of the VTRs 30, 31 and the disk recorders 32, 33 are connected to video signal input terminals of the switcher 29 to provide a first video input signal 40, a second video input signal 41, a third video input signal 42, and a fourth video input signal 43, respectively.

A fundamental function of the control apparatus 20 shown in FIG. 3 will be described with reference to FIG. 4.

Figure 4:
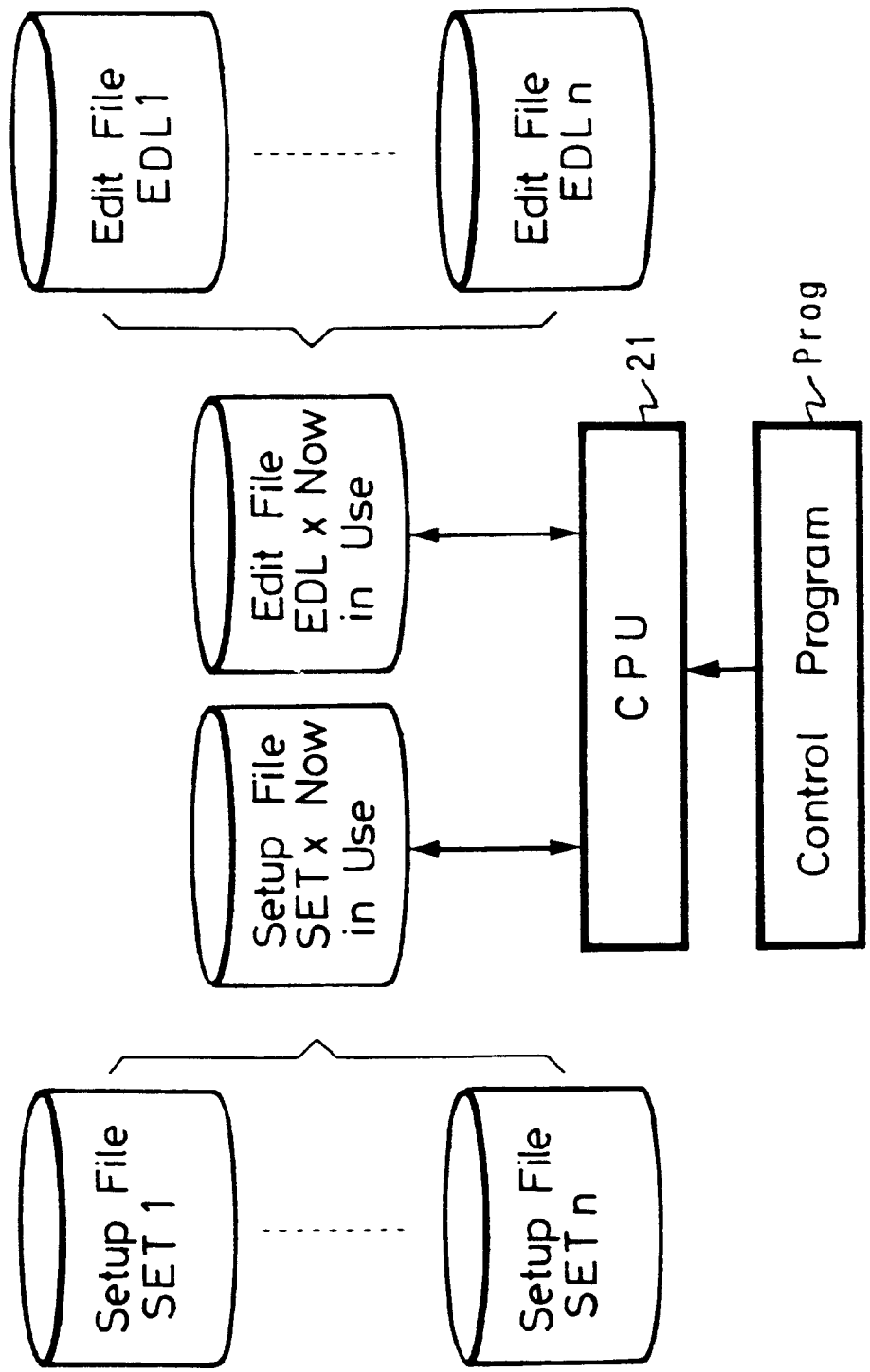
FIG. 4 is a functional block diagram used to explain setup files and edit files of the editing apparatus shown in FIG. 3.

As shown in FIG. 4, according to this embodiment, a CPU 21 is operated by a control program Prog loaded onto the ROM 24 or RAM 23 through the bus 22 from a disk driver 28 shown in FIG. 3. As shown in FIG. 4, on the basis of the program Prog, setup files SET1 to SETn and edit files EDL1 to EDLn are made on the picture screen of the monitor 27 connected to the control apparatus shown in FIG. 3.

The setup files SET1 to SETn are setup data files that are used to set operation parameters of the respective elements shown in FIG. 3, such as the layout of the recorder, a cross-point or the like in accordance with objects in use. Specifically, conditions of the respective elements shown in FIG. 3, e.g., various conditions of every equipments, such as connection, operation, mode or the like can be changed by executing the contents of the setup files SET1 to SETn by the CPU 21.

The edit files EDL1 through EDLn are data files that are used to represent edit contents. In FIG. 4, the edit files EDL1 through EDLn are data files, each representing edit content in each object.

It is customary that the setup files SET1 through SETn and the edit files EDL1 through EDLn are recorded on a disk set on the disk driver 28 shown in FIG. 3 in correspondence with each other. By way of example, the corresponding setup files SET1 through SETn may be recorded on the edit files EDL1 through EDLn.

With the above-mentioned arrangement, when a desired one of edit files EDL1 through EDL1 is selected on a selection menu picture for selecting the edit files EDL1 through EDLn (which will be described later on), data of the selected one of the edit files EDL1 through EDLn is read out from the disk set on the disk driver 28 and editing corresponding to the contents of the selected one of the edit files EDL1 through EDLn can be carried out. Also, one of the corresponding setup files SET1 through SETn is read out from the disk and data of the setup file thus read out in the setup files SET1 through SETn is supplied to the RAM 23 shown in FIG. 3 and held in (i.e., held in a so-called resident state) the RAM 23, thereby each equipment is set up.

The edit files EDL1 through EDLn and the setup files SET1 through SETn are associated with each other on the program in advance, and an area to be used and a standby area are prepared in the RAM 23, for example. Then, the edit files EDL1 through EDLn and the setup files SET1 through SETn are stored in the standby area under the condition that they are associated with each other as shown in FIG. 4. When in use, the edit files EDL1 through EDLn selected on the menu picture and the corresponding setup files SET1 through SETn are stored in the area to be used, whereby the respective equipment in the editing apparatus shown in FIG. 3 can be set up at once. In this case, the respective equipment can be set up at high speed as compared with the above-mentioned method.

How to select the edit files EDL1 through EDLn and how to set up the equipment by using the corresponding setup files SET1 through SETn will be described with reference to a flowchart of FIG. 5.

Figure 5:
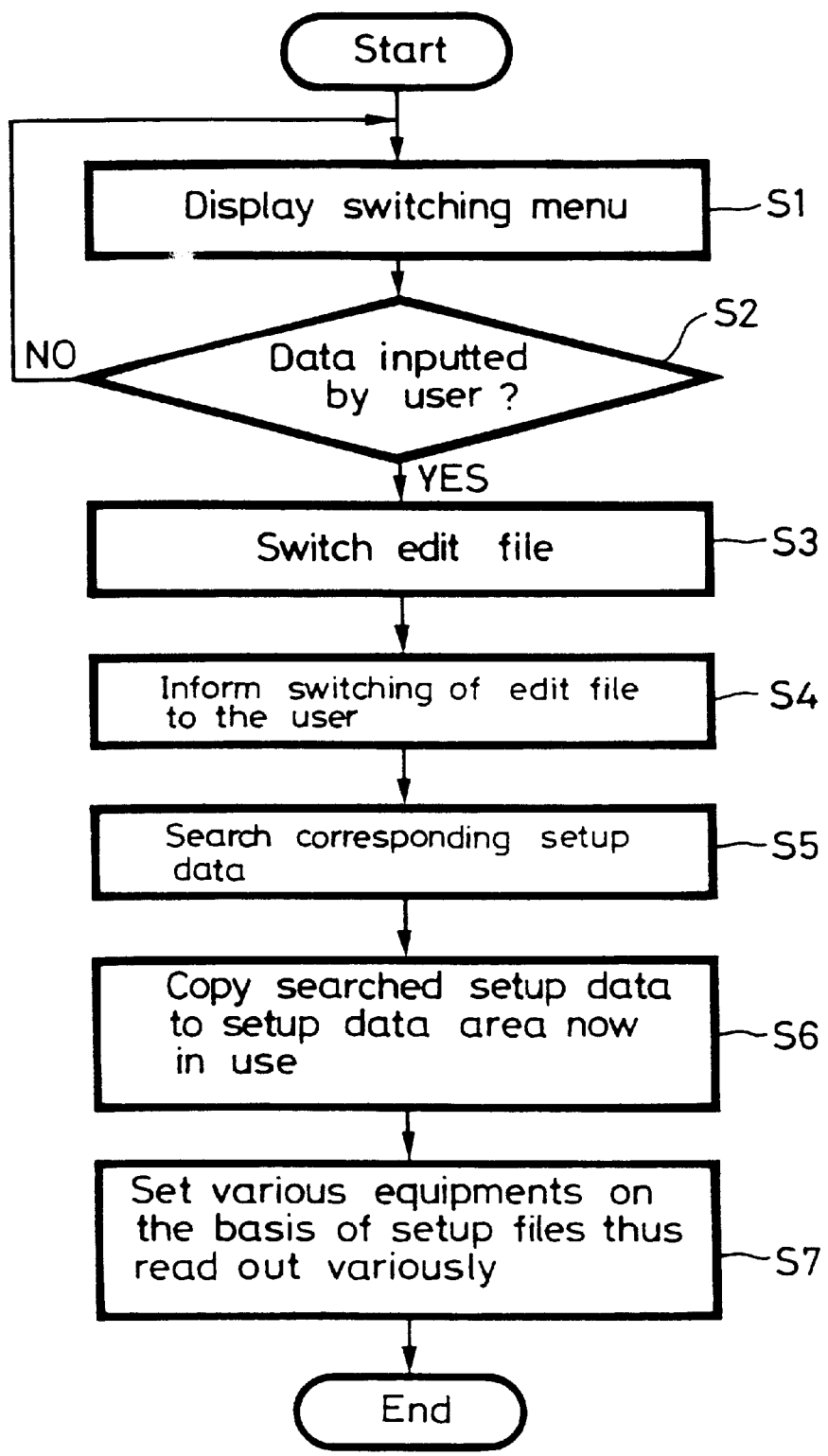
FIG. 5 is a flowchart to which reference will be made in explaining operation of the editing apparatus shown in FIG. 1.

Referring to FIG. 5, following the start of operation, a switching menu is displayed at step S1. Specifically, the edit files EDL1 through EDLn are displayed on the monitor 27 shown in FIG. 3 by some suitable means, such as user file names or the like. Then, the processing proceeds to the next decision step S2.

It is determined in decision step S2 whether or not the user inputs data. If a YES is outputted at decision step S2, then the processing proceeds to step S3. More specifically, it is determined at decision step S2 whether or not the user selected a desired one of the edit files EDL1 through EDLn displayed on the switching menu picture by the pointing device 25 or keyboard 26.

In step S3, the edit files EDL1 through EDLn are switched, and the processing proceeds to step S4. Specifically, a designated one of the edit files EDL1 through EDLn is copied from the standby area to the area to be used in the RAM 23 as described above.

In step S4, the fact that the edit file was switched is informed to the user, and the processing proceeds to step S5. In step S4, the user can learn that the edit file has been switched when a cursor is blinking (intermittently reversed) or being reversed at the displayed position of the file name or file number of the designated and switched one of the edit files EDL1 to EDLn.

In step S5 the, corresponding one of the setup files SET1 through SETn is searched. Specifically, the corresponding setup files SET1 through SETn in the standby area of the RAM 23 are searched. Then, the processing proceeds to step S6.

In step S6, the searched one of the setup files SET1 through SETn is copied to the area to be used. Specifically, the setup files SET1 through SETn that had been stored in the standby area of the RAM 23 are copied to the area to be used. Then, the processing proceeds to step S7.

In step S7, each equipment is variously set on the basis of the setup file thus read out, and the processing is ended.

As will be clear from the above description, according to this embodiment, while watching various editing setting pictures and equipment pictures displayed on the picture screen of the monitor 27, the user can from the edit files EDL1 to EDLn and the corresponding setup files SET1 through SETn by some suitable means, such as the pointing device 25, the keyboard 26 or the like. These files are stored in the disk of the disk driver 28 or the edit files EDL1 through EDLn and setup files SET1 through SETn thus formed are read out from the disk of the disk driver 28 when the control apparatus 20, for example, is actuated. These data are stored in the standby area of the RAM 23 as described above. Then, when any one of the edit files EDL1 through EDLn is selected on the menu picture, the selected one of the edit files EDL1 through EDLn and the corresponding one of the setup files SET1 through SETn are read out from the standby area of the RAM 23, and copied to the area to be used. The user can set up the equipment in various manners by the setup files SET1 through SETn copied to the area to be used. Then, the user can carry out the editing based on the edit files EDL1 through EDLn.

When the edit files EDL1 through EDLn are formed, the setup files SET1 through SETn also may be formed at the same time and the setup files SET1 through SETn may be contained in the edit files EDL1 through EDLn.

Figure 6:
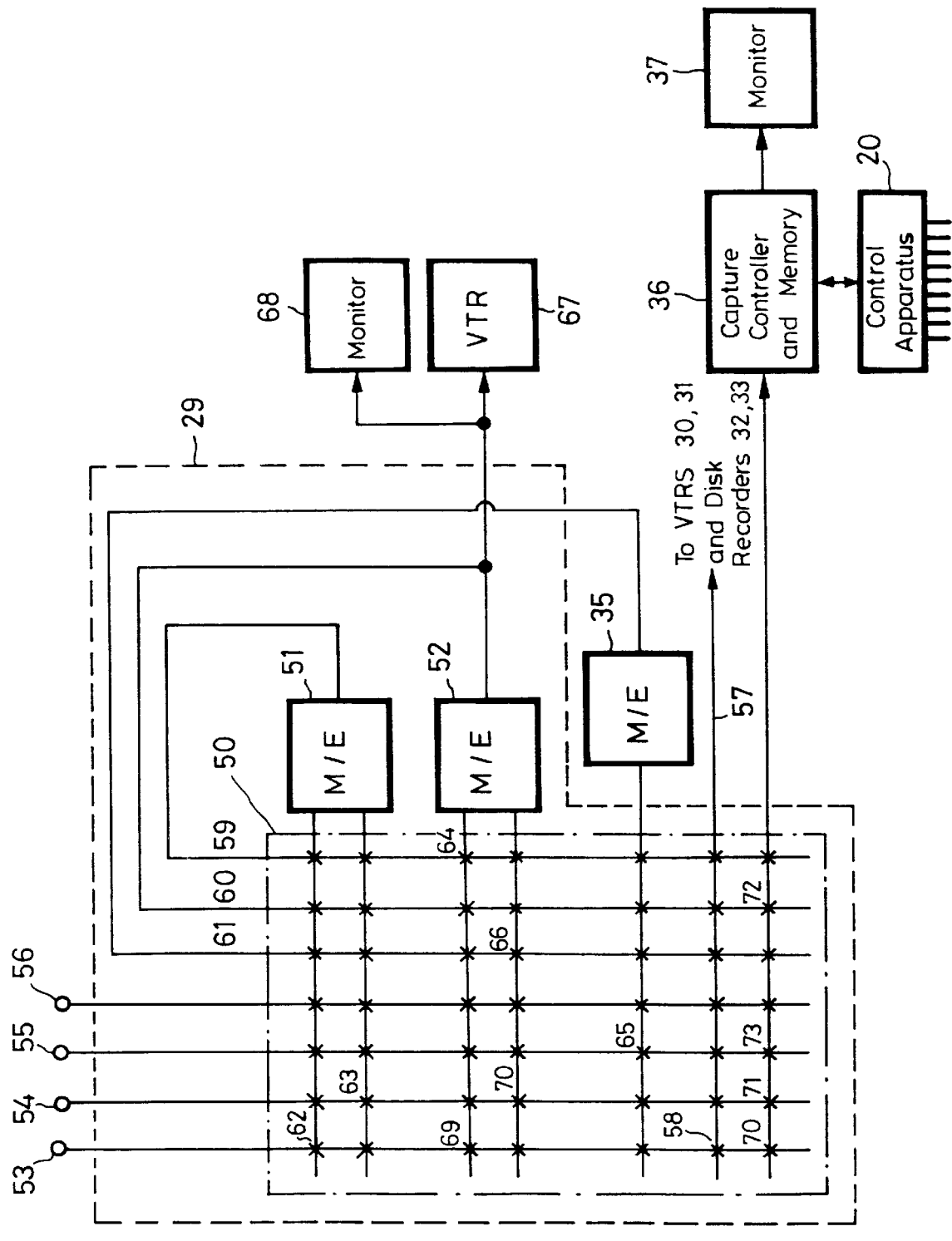
FIG. 6 is a block diagram showing a specific circuit arrangement of the switcher shown in FIG. 3.

A specific circuit arrangement of the switcher 29 shown in FIG. 3 will be described below with reference to FIG. 6. As shown in FIG. 6, the switcher 29 is comprised of a matrix switcher 50, a first mixer/effector circuit (M/E) 51 and a second mixer/effector circuit (M/E) 52. The VTRs 30, 31 and the disk recorders 32, 33 shown in FIG. 3 are connected to input terminals 53, 54, 55 and 56 of the matrix switcher 50, and the video signals therefrom are supplied respectively on lines 40, 41, 42, and 43 to the above input terminals 53, 54, 55 and 56. The matrix switcher 50 selectively supplies the video signals supplied to the input terminals 53, 54, 55 and 56 thereof to the first mixer/effector circuit 51, the second mixer/effector circuit 52, the DME 35 and the capture controller and memory 36 by turning on and off switches of respective cross-points (shown by Xs in FIG. 6) on the basis of a control signal supplied thereto from the control apparatus 20.

The first mixer/effector circuit 51 and the second mixer/effector circuit 52 are arranged in exactly the same fashion and selectively output the first and second input video signals together with various video effects, such as wipe effect, dissolve effect, fade effect, cut or the like. Alternatively, the first and second mixer/effector circuits 51, 52 output video signals fed directly to one terminal thereof.

When the signal reproduced by the VTR 30 is recorded by the disk recorder 32 to form the same material as that of the video signal recorded by the VTR 30, the switch at the cross-point 58 is turned on so that the video signal inputted from the input terminal 53 is transmitted through a bus line 57 to the disk recorder 32. The video signal thus transmitted is recorded by the disk recorder 32. At that time, although the bus line 57 is connected to the VTRs 30, 31 and the disk recorder 33, when the video signal is supplied through the bus line 57, the video signal thus transmitted is recorded only by the VTR or disk recorder that is placed in the recording mode.

Output signals from the first mixer/effector circuit 51, the second mixer/effector circuit 52 and the DME 35 are inputted to input terminals 59, 60 and 61 of the matrix switcher 50. The DME 35 is a video effector that can effect a three-dimensional deform processing on the input video signal so that an input image is deformed along a cylindrical surface or spherical surface. The matrix switcher 50 can supply the video signals inputted to the input terminals 50, 60, 61 thereof to a desired one of the first mixer/effector circuit 51, the second mixer/effector circuit 52, the DME 35 and the capture controller and memory 36 by turning on switches of desired cross-points on the basis of the control signal supplied thereto from the control apparatus 20.

An example of operation of the switcher 29 will be described below, in which case the first and second video signals respectively reproduced by the VTRs 30, 31 are switched with a wipe effect, a third video signal reproduced from the disk recorder 32 is deformed so that an image represented by the third video signal is deformed along the spherical surface and then the third video signal thus deformed and the second video signal are synthesized so that the second video signal thus switched with the wipe effect being achieved represents a background.

The first video signal reproduced by the VTR 30 is inputted to the matrix switcher 50 from the input terminal 53 and the matrix switcher 50 supplies the input first video signal to one input terminal of the first mixer/effector circuit 51 by turning on the switch of the cross-point 62. The second video signal reproduced by the VTR 31 is inputted to the matrix switcher 50 from the input terminal 54 and the matrix switcher 50 supplies the second video signal to the other input terminal of the first mixer/effector circuit 51 by turning on the switch of the cross-point 63. The first mixer/effector circuit 51 outputs the first video signal during the first period and then outputs the second video signal instead of the first video signal as a wipe effect switching transient. The output video signal from the first mixer/effector circuit 51 is fed through the input terminal 59 back to the matrix switcher 50 which supplies the output video signal from the first mixer/effector circuit 51 to one input terminal of the second mixer/effector circuit 52 by turning on the switch of the cross-point 64.

A third video signal reproduced by the disk recorder 32 is inputted from the input terminal 55 to the matrix switcher 50. Then, the matrix switcher 50 supplies the third video signal to the DME 35 by turning on the switch of the cross-point 65. The DME 35 effects a deforming processing on the third video signal supplied thereto so that an image represented by the third video signal is curved along the spherical surface. An output signal from the DME 35 is fed through the input terminal 61 back to the matrix switcher 50, and the matrix switcher 50 supplies the output signal of the DME 35 to the other input terminal of the second mixer/effector circuit 52 by turning on the switch of the cross-point 66.

The second mixer/effector circuit 52 synthesizes the third video signal supplied to the other input terminal thereof to the second video signal supplied to one input terminal thereof in a keying fashion. A keying signal used in this keying processing is supplied from the DME 35 to the second mixer/effector circuit 52.

An output signal from the second mixer/effector circuit 52 is recorded by a VTR 67 and displayed on a monitor 68.

Figure 2A:
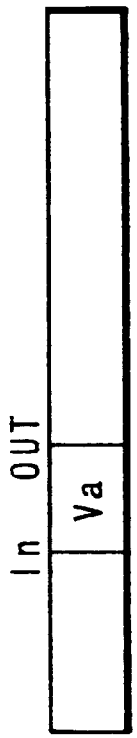
FIGS. 2A through 2G are schematic diagrams used to explain operation of the conventional editing apparatus shown in FIG. 1, respectively.
Figure 2B:
Figure 2C:
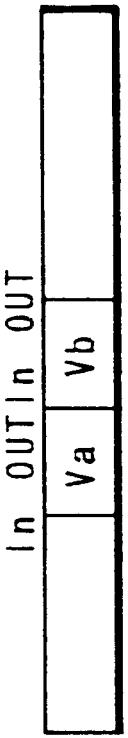
Figure 2D:
Figure 2E:
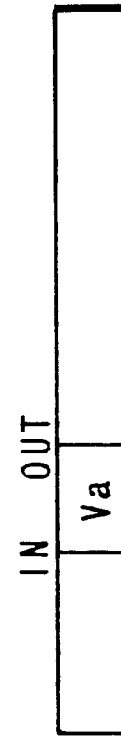
Figure 2F:
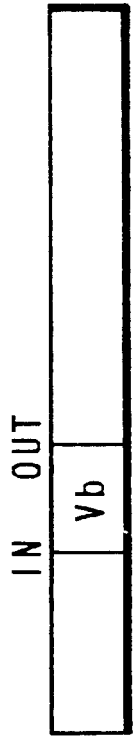
Figure 2G:
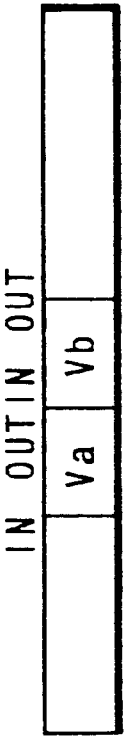

Operation of the editing apparatus shown in FIG. 3 will be described below with reference to FIGS. 7 through 9, in that order. Specifically, let us describe how to edit the materials Va, Vb according to the transition processing and how to review or record the edited material when the materials Va, Vb are recorded on the video tape cassette of the VTR 30 (this is also true for the VTR 31) as shown in FIG. 2D.

Figure 7:
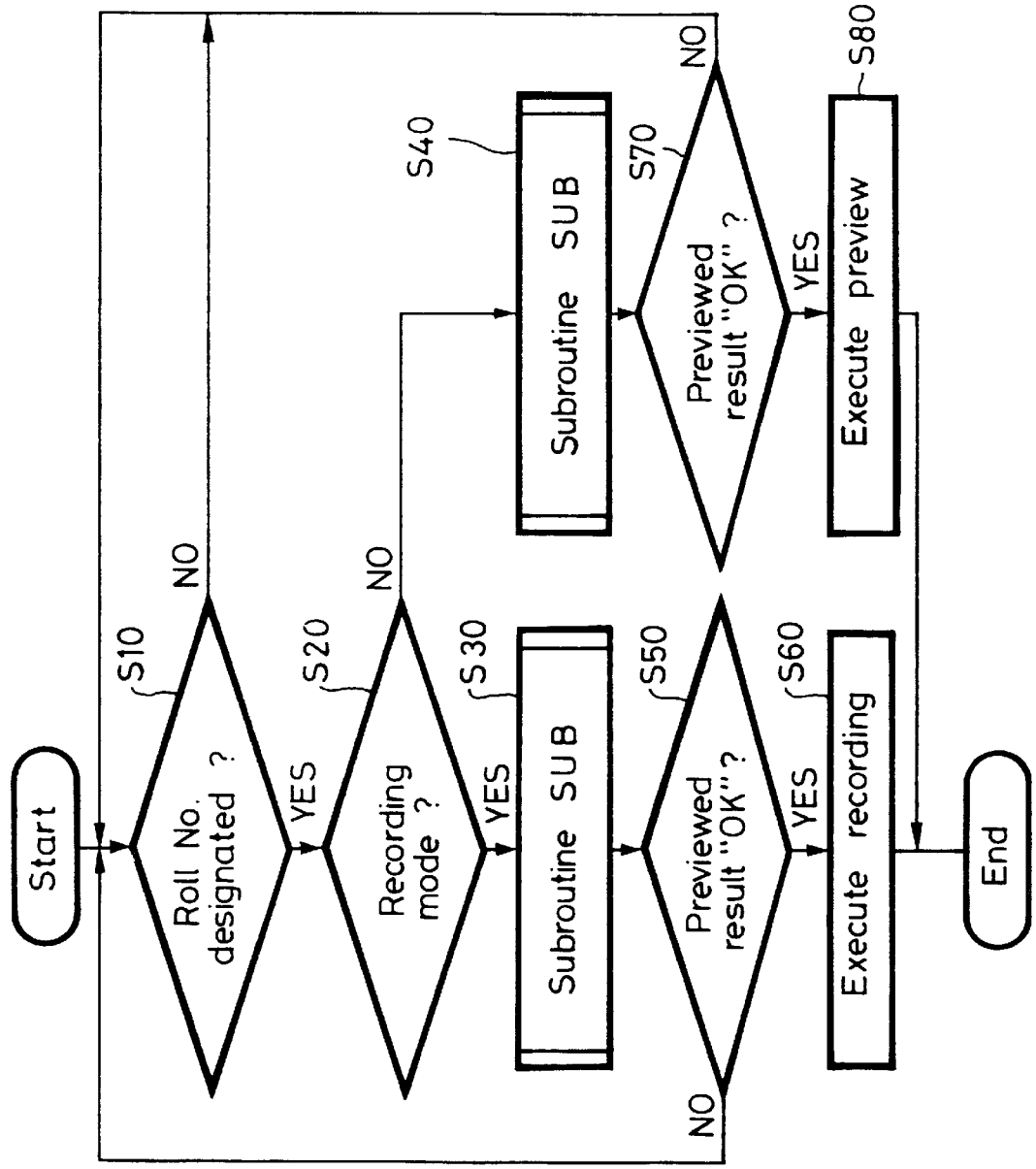
FIG. 7 is a flowchart to which reference will be made in explaining operation of the editing apparatus shown in FIG. 3.

Referring to FIG. 7, following the start of operation, it is determined in decision step S10 whether or not a roll number is designated. If a YES is outputted at decision step S10, then the processing proceeds to the next decision step S20. Specifically, the user designates the roll number on the picture displayed on the picture screen of the monitor 27 shown in FIG. 3 by using the pointing device 25 or the keyboard 26.

Figures 8A, 8B, 8C, 8D:
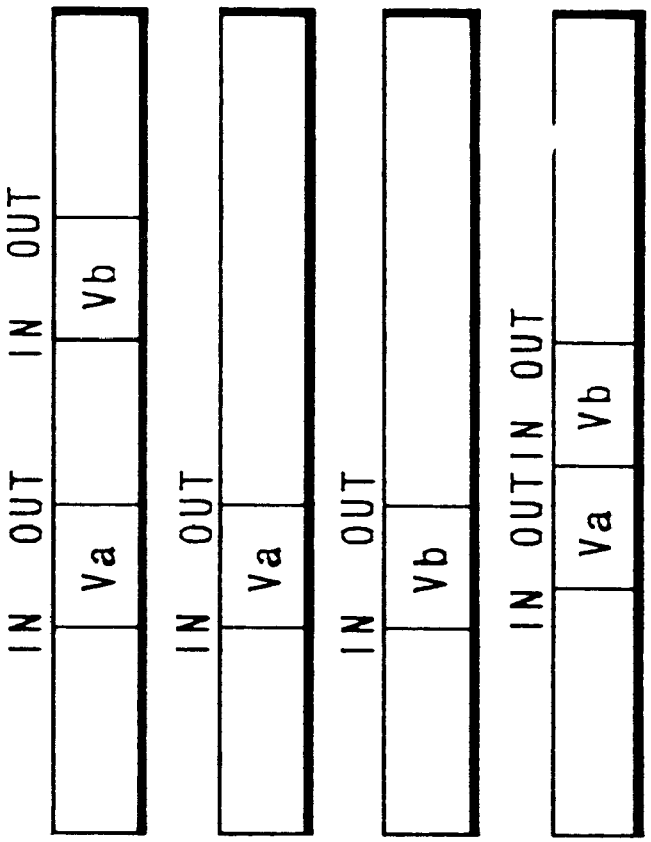
FIGS. 8A through 8D are schematic diagrams used to explain operation of the editing apparatus shown in FIG. 3, respectively.

The roll represents a material to be reproduced. A roll A means that the first tape selected on the playback side (VTRs 30 and 31) and a roll B means a second tape selected on the playback side (VTRs 30 and 31). Therefore, when the roll number is used as ID (identification) data which represents the VTR 30 or 31, for example, if the user sets the ID data representing the same VTR 30 or 31 in both of the rolls A and B, then the materials Va, Vb are recorded on the video tape cassettes set in the VTR 30 or 31 as shown in FIG. 8A.

The user may designate the rolls A and B or the roll A or the roll B in the VTR 30 or 31, for example, on the menu picture.

Referring back to FIG. 7, it is determined in decision step S20 whether or not the VTR is set in the recording mode. If a YES is outputted at decision step S20, then the processing proceeds to step S30 (i.e., subroutine SUB). If on the other hand a NO is outputted at decision step S20, then the processing proceeds to step S40 (i.e., subroutine SUB). The user can designate the recording mode on the picture screen of the monitor 27 by means of the pointing device 25 or the keyboard 26.

Steps S30 and S40 will collectively be described with reference to a flowchart of FIG. 9.

Figure 9:
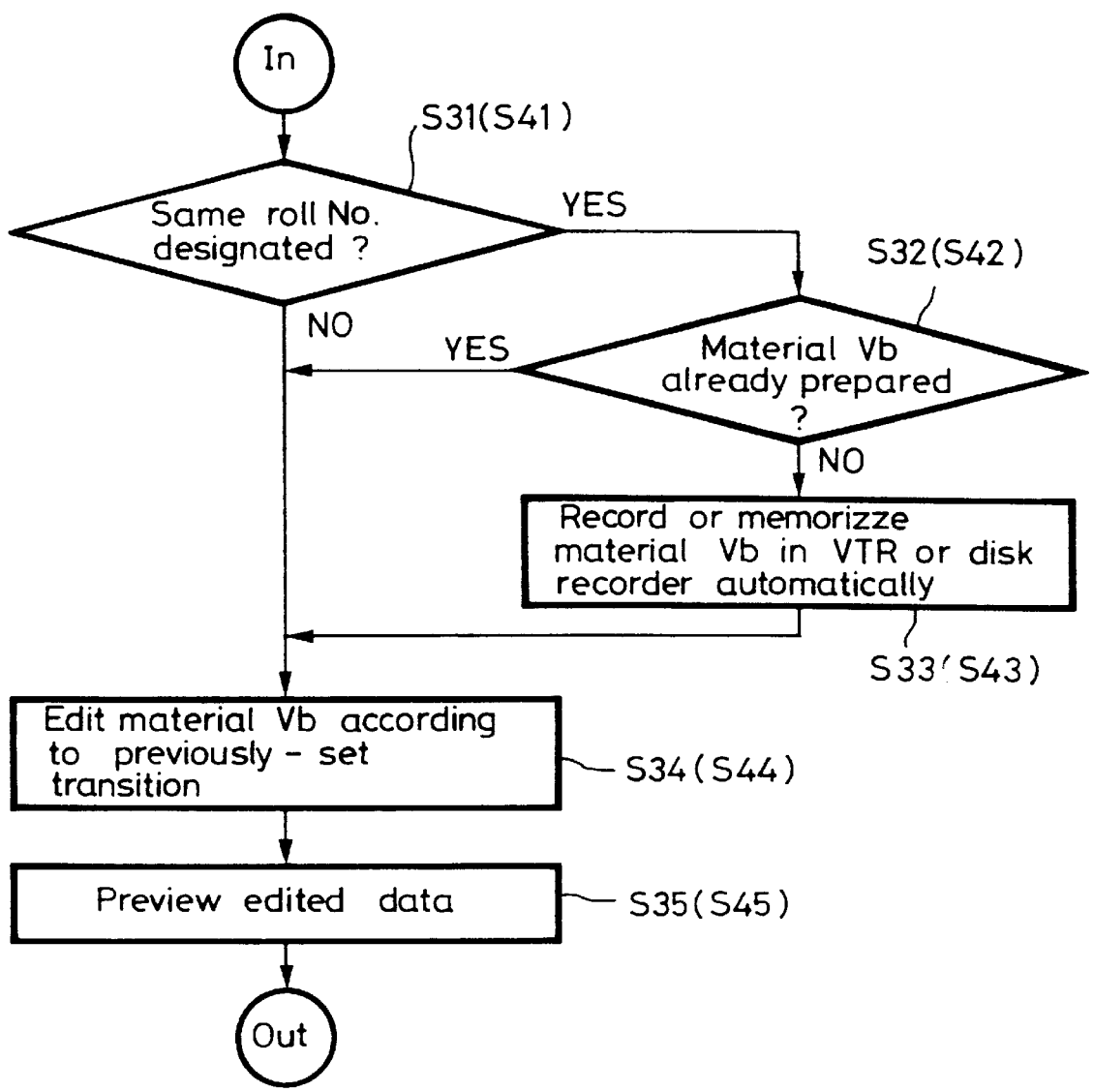
FIG. 9 is a flowchart to which reference will be made in explaining subroutines of the flowchart shown in FIG. 7.

Referring to FIG. 9, it is determined in decision step S31 (S41) whether or not the same roll number is designated on the rolls A and B. If a YES is outputted at decision step S31 (S41), then the processing proceeds to the next decision step S32 (S42). If on the other hand a NO is outputted at decision step S31 (S41), then the processing proceeds to step S34 (S44).

It is determined in decision step S32 (S42) whether or not the material Vb was already prepared. If a YES is outputted at decision step S32 (S42), then the processing proceeds to step S33 (S43). The above step of "to determine whether or not the material Vb was already prepared" is equivalent to the decision that it is determined whether or not the material Vb was already recorded or memorized in the VTR 31 or the disk recorders 32, 33 from the VTR 30.

In step S33 (S43), the material Vb is buffered automatically, and the processing proceeds to step S34 (S44). The term "buffer" used herein means that the material Vb is recorded on or memorized in the VTR 31 or the disk recorders 32, 33 as shown in FIG. 8C. Therefore, equivalently, the material Va is recorded on or memorized in the VTR 30, the material Vb is recorded on or memorized in the VTR 31 or the material Va is recorded on or memorized in the VTR 30 and the material Vb is recorded on or memorized in the disk recorder 32 or 33 as shown in FIGS. 8B and 8C.

In step S34 (S44), the material Vb is edited according to the previously-set transition, and the processing proceeds to step S35 (S45).

In step S35 (S45), edited data is previewed, and this subroutine SUB is ended. Then, the processing proceeds to step S50 (or step S70 when the processing proceeds from step S40) of the program shown in FIG. 7. That is, the materials Va, Vb are displayed on the monitor 68 shown in FIG. 3.

As shown in FIG. 7, it is determined in decision step S50 whether or not a previewed result is "OK". If a YES is outputted at decision step S50, then the processing proceeds to step S60. Specifically, when the user inputs data representing that the previewed result is satisfactory by means of the mouse (pointing device) 25 or the keyboard 26, then the processing proceeds to the next step S60.

In step S60, the recording is executed, and the processing is ended. More specifically, according to this embodiment, the VTR 30 is set in the playback mode under the control of a control signal supplied thereto and reproduces the material Va. Simultaneously, while watching the time codes, the user sets the VTR 31 in the playback mode at a timing point a little before the transition period under the control of a control signal supplied thereto to thereby reproduce the material Vb at its portion a little before the in-point IN. In the transition period, the switcher 29 carries out the transition processing, such as wipe, dissolve or mix in response to a control signal supplied thereto.

Then, the materials Va, Vb are memorized in the disk recorders 32, 33, for example. If the material Vb is previously bufffered or memorized in the disk recorder 32 or 33, then the VTR 31 is set in the recording mode by a control signal supplied thereto, and the VTR 31 records the material Va supplied thereto from the VTR 30 or the material Vb supplied thereto from the disk recorder 32 or 33. More specifically, as shown in FIG. 8D, the materials Va, Vb are edited and recorded by the VTR 31 or the disk recorder 32 or 33.

Referring to FIG. 7, it is determined in decision step S70 whether the previewed result is "OK". If a YES is outputted at decision step S70, then the processing proceeds to step S80. In other words, if the user inputs data representing that the previewed result is satisfactory by means of the mouse (pointing device) 25 or the keyboard 26, then the processing proceeds to the next step S80.

In step S80, the preview is executed and then the processing is ended. More specifically, according to this embodiment, the VTR 30 is set in the playback mode under the control of a control signal supplied thereto and reproduces the material Vb. Simultaneously, while watching the time code, the user sets the VTR 31 in the playback mode at a timing point a little before the transition period under the control of a control signal supplied thereto to thereby reproduce the material Vb from its portion a little before the in-point IN. In the transition period, the switcher 29 carries out the transition processing, such as wipe, dissolve or mix under the control of a control signal supplied thereto.

Then, the video signals of the materials Va, Vb are supplied to the monitor 68 and displayed on the picture screen of the monitor 68 as an image. If the material Vb was previously buffered or memorized in the disk recorder 32 or 33, then a video signal from the material Va of the VTR 30 or a video signal from the material Vb of the disk recorder 32 or 33 is displayed on the picture screen of the monitor 68.

Since one of the two edit materials is automatically buffered or memorized when the two edit materials are designated on the video tape cassette set on the VTR 30 or 31 or the same VTR 30 or 31 is designated on the two edit materials, the user can be prevented from being annoyed by a cumbersome job, such as recording or memorizing one of the two edit materials in other VTR or other disk recorder in a manual fashion. Also, it is possible to prevent the edit files EDL1 through EDLn from being made twice.

While the two edit materials are designated on one VTR 30 or 31 as described above, the present invention is not limited thereto and three or four edit materials may be designated on the VTR 30 or 31. In this case, there should be prepared the corresponding number of VTRs and disk recorders in which edit materials are to be memorized.

How to designate the edit materials Va, Vb will be described below with reference to FIG. 10.

The edit material can be determined by designating the in-point IN and the out-point OUT as will be clear from FIGS. 8A through 8D. When the edit material is determined, the VTR 30 or 31 is set in the reproducing mode and a video signal reproduced by the VTR 30 or 31 is displayed on the picture screen of the monitor 27 or 37. Also, the user designates (i.e., so-called mark-in and mark-out) the edit material at desired in-point IN and out-point OUT by some suitable means, such as the pointing device 25, the keyboard 26 or the like. Then, a resultant time code is memorized in the control apparatus 20.

When the edit material is memorized according to the buffering process or the in-point IN and the out-point OUT of the edit material are simply determined, it is possible to use a memory (not shown) of the capture controller and memory 36 and the RAM 23 shown in FIG. 3, in addition to the VTRs 30, 31 and the disk recorders 32, 33.

Operation of the capture controller and memory 36 will be described below with reference to FIGS. 3, 6 and FIGS. 11 to 13. Initially, let us describe the case that the in-point and the out-point used when the second mixer/effector circuit 52 selectively outputs first and second video signals with a wipe effect being achieved after the first and second video signals were reproduced by the VTRs 30, 31 are displayed on the monitor 37.

The first and second video signals reproduced by the VTRs 30, 31 are inputted to one input terminal and the other input terminal of the second mixer/effector circuit 52 through cross-points 60 and 70 of the matrix switcher 50, respectively. The second mixer/effector circuit 52 selectively supplies the first and second video signals inputted thereto with a wipe effect being achieved to the monitor 68.

Initially, the user places the VTR 30 in the reproducing mode by inputting control data through the keyboard 26, and turns on the switch of the cross-point 69 of the matrix switcher 50. Further, the second mixer/effector circuit 52 is controlled such that the video signal reproduced from the VTR 30 is directly supplied to the monitor 68. When video frame data which is suitable as the in-point and the out-point is reproduced, the user inputs a video clip command signal by means of the keyboard 26. Then, the control apparatus 20 controls the matrix switcher 50 so that the video frame data obtained at that time is supplied through the cross-point 70 of the matrix switcher 50 to the capture controller and memory 36. Also, the control apparatus 20 controls the capture controller and memory 36 so that the capture controller and memory 36 memorizes therein the video frame data. The video frame data representing the in-point and the out-point memorized in the capture controller and memory 36 is displayed by the monitor 37 in the forms shown by IV2, OV2 in FIG. 11. The control apparatus 20 is supplied with time codes through a control line from the VTR 30 and permits the video frame data shown by IV2, OV2, i.e., time codes corresponding to the in-point and the out-point to be memorized in the RAM 23.

Similarly, the user places the VTR 31 in the reproducing mode by inputting control data through the keyboard 26, and turns on the switch of the cross-point 70 of the matrix switcher 50. Further, the second mixer/effector circuit 52 is controlled such that the video signal from the VTR 31 is directly supplied to the monitor 68. When video frame data which is suitable as the in-point and the out-point is reproduced, the user inputs a video clip command signal by means of the keyboard 26. Then, the control apparatus 20 controls the matrix switcher 50 so that the video frame data obtained at that time is supplied to the capture controller and memory 36 through a cross-point 71 of the matrix switcher 50. Also, the control apparatus 20 controls the capture controller and memory 36 such that the capture controller and memory 36 memorizes therein the video frame data. The video frame data representing the in-point and the out-point memorized in the capture controller and memory 36 is displayed by the monitor 37 in the forms shown by IV3, OV3 in FIG. 11. The control apparatus 20 is supplied with time codes through a control line from the VTR 31 and permits the video frame data shown by IV3, OV3, i.e., time codes corresponding to the in-point and the out-point, to be memorized in the RAM 23.

Subsequently, the user places the VTRs 30 and 31 in the playback mode, and turns on the switches of the cross-points 69, 70 of the matrix switcher 50 to thereby supply the first and second video signals played back from the VTRS 30, 31 to the second mixer/effector circuit 52. The second mixer/effector circuit 52 selectively outputs and supplies one of the first and second video signals with a wipe effect being achieved to the monitor 68. While watching the picture screen of the monitor 68, the user inputs the video clip command signal through the keyboard 26 when video frame data which is suitable as the in-point and the out-point is outputted from the second mixer/effector circuit 52. Then, the control apparatus 20 controls the matrix switcher 50 such that the video frame data obtained at that time is supplied to the capture controller and memory 36 through a cross-point 72 of the matrix switcher 50. Also, the control apparatus 20 controls the capture controller and memory 36 so that the capture controller and memory 36 memorizes therein the video frame data. The video frame data representative of the in-point and the out-point memorized in the capture controller and memory 36 is displayed by the monitor 37 in the form shown by "5115" in FIG. 12. The control apparatus 20 is supplied with time codes through a control line from the VTRs 30, 31 and permits the video frame data shown by "5115" in FIG. 12, i.e., time codes corresponding to the in-point and the out-point, to be memorized in the RAM 23.

The aforesaid operation is repeated until the in-point and the out-point set on the first video signal supplied to one input terminal of the second mixer/effector circuit 52, the in-point and the out-point set on the second video signal supplied to the other input terminal of the second mixer/effector circuit 52 and the in-point and the out-point set on the output signal from the second mixer/effector circuit 52 reach desired in-points and out-points. After the above respective in-points and out-points reached desired in-points and out-points, the control apparatus 20 reads time code data representing cues out from the RAM 23 and controls operation of the VTRs 30, 31 and the second mixer/effector circuit 52 on the basis of the time code data thus read out. Then, only the output video signal representing an image ranging from the in-point to the out-point shown in FIG. 12 and in which the first and second images are switched by the video frame data shown by OV2 and IV3 in FIG. 11 between the in-point and the out-point is recorded by the VTR 67, and the editing is ended.

Figure 11:
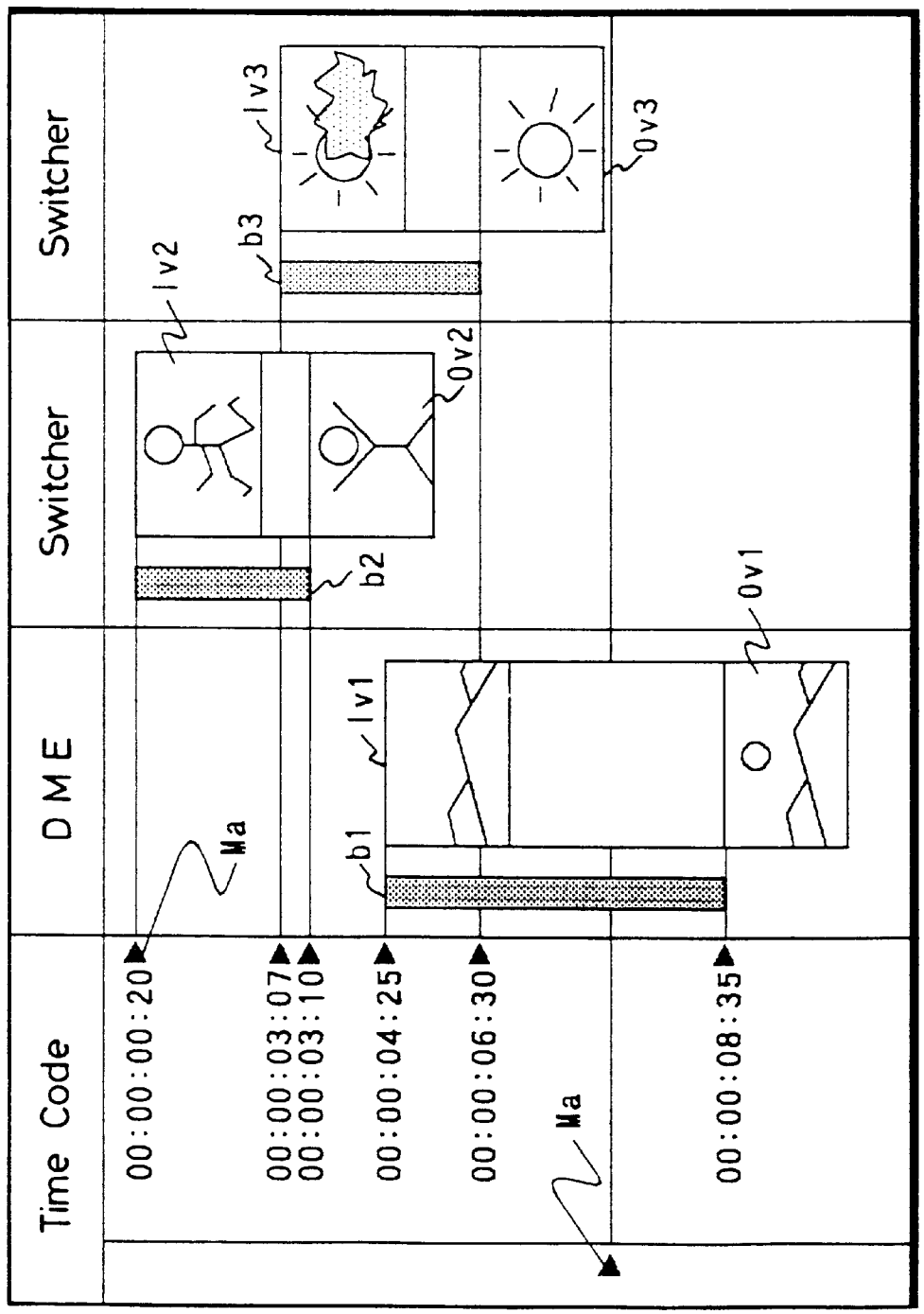
FIG. 11 is a schematic diagram used to explain display operation of video clips in the editing apparatus shown in FIG. 3.

As described above, according to the present invention, since the video frame data representing the in-points and the out-points set in the video signals reproduced by the VTRs 30, 31 and the video signal outputted from the second mixer/effector circuit 52 are displayed by the monitor 68, cues used upon editing can be set with ease from a visual sense standpoint. Further, since the video frame data representing the in-points and the out-points set on the first and second video signals reproduced by the VTRs 30, 31 are displayed along the time axis as shown in FIG. 11, a time relationship of the video frame data can be understood with ease. Furthermore, since the time code values corresponding to the video frame data are displayed adjacent to the video frame data, a time relationship among the video frame data can be understood more easily.

Operation of the capture controller and memory 36 will be described next. By way of example, let us describe the case that the first video signal reproduced by the VTR 30 and the second video signal reproduced by the VTR 31 are switched by the first mixer/effector circuit 51 so as to achieve video special effects, such as wipe or the like, the video signal reproduced by the disk recorder 32 is supplied to and processed by the DME 35 in an image deforming fashion, and that the video signal, processed in an image deforming fashion by the DME 35, is mixed to the video signal outputted from the first mixer/effector circuit 51 by a keying signal.

As shown in FIG. 6, the first and second video signals reproduced by the VTRs 30, 31 are supplied to one input terminal and the other input terminal of the first mixer/effector circuit 51 through the cross-points 62, 63 of the matrix switcher 50, respectively. The third video signal reproduced from the disk recorder 32 is supplied to the DME 35 through the cross-point 65 of the matrix switcher 50. The first mixer/effector circuit 51 switches the inputted first and second video signals with a wipe effect being achieved and supplies the same to the input terminal 59 of the matrix switcher 50. The DME 35 processes the third video signal supplied thereto in such a signal processing fashion as an image deforming or the like and supplies a video signal thus processed to the input terminal 61 of the matrix switcher 50.

Initially, the user sets the VTR 30 in the playback mode by inputting control data through the keyboard 26 and turns on the switch of the cross-point 62 of the matrix switcher 50. Further, the first mixer/effector circuit 51, the cross-point 64 and the second mixer/effector circuit 52 are controlled such that the video signal from the VTR 30 is directly supplied to the monitor 68. When video frame data which is suitable as the in-point and the out-point is reproduced, the user inputs a video clip command signal by means of the keyboard 26. Then, the control apparatus 20 controls the matrix switcher 50 so that the video frame data obtained at that time is supplied to the capture controller and memory 36 through the cross-point 70 of the matrix switcher 50. Also, the control apparatus 20 controls the capture controller and memory 36 so that the capture controller and memory 36 memorizes that video frame data. The video frame data representing the in-point and the out-point memorized in the capture controller and memory 36 are displayed by the monitor 37 in the forms shown by IV2, OV2 in FIG. 11. The control apparatus 20 is supplied with time codes through a control line from the VTR 30 and permits the video frame data shown by IV2, OV2, i.e., time codes corresponding to the in-point and the out-point, to be memorized in the RAM 23.

Similarly, the user sets the VTR 31 in the reproducing mode by inputting control data through the keyboard 26, and turns on the switch provided at the cross-point 63 of the matrix switcher 50. Further, the first mixer/effector circuit 51, the cross-point 64 and the second mixer/effector circuit 52 so that the video signal from the VTR 31 is directly supplied to the monitor 68. When video frame data which is suitable as the in-point and the out-point are reproduced, the user inputs the video clip command signal by the keyboard 26. Then, the control apparatus 20 controls the matrix switcher 50 so that the video frame data obtained at that time is supplied to the capture controller and memory 36 through the cross-point 71 of the matrix switcher 50. Also, the control apparatus 20 controls the capture controller and memory 36 so that the capture controller and memory 36 memorizes therein that video frame data. The video frame data representing the in-point and the out-point memorized in the capture controller and memory 36 are displayed by the monitor 37 in the forms shown by IV3, OV3 in FIG. 11. The control apparatus 20 is supplied with time codes through a control line from the VTR 31 and permits the video frame data shown by IV3, OV3, i.e., time codes corresponding to the in-point and the out-point to be memorized in the RAM 23.

In a like manner, the user sets the disk recorder 32 in the reproducing mode by inputting control data through the keyboard 26 and turns on the switch provided at the cross-point 65 of the matrix switcher 50. Also, the DME 35, the second mixer/effector circuit 52 and the cross-point 66 are controlled such that the video signal from the disk recorder 32 is directly supplied to the monitor 68. When video frame data which are suitable as the in-point and the out-point are reproduced, the user inputs the video clip command signal by means of the keyboard 26. Then, the control apparatus 20 controls the matrix switcher 50 so that the video frame data obtained at that time is supplied to the capture controller and memory 36 through the cross-point 73 of the matrix switcher 50. Also, the control apparatus 20 controls the capture controller and the memory 36 so that the capture controller and the memory 36 memorizes the video frame data. The video frame data representing the in-point and the out-point memorized in the capture controller and memory 36 are displayed by the monitor 37 in the forms shown by IV1, OV1 in FIG. 11. The control apparatus 20 is supplied with time codes through the control line from the disk recorder 32, and permits the video frame data represented by IV1, OV1, i.e., time codes corresponding to the in-point and the out-point, to be memorized in the RAM 23.

Subsequently, the user sets in the VTRs 30, 31 and the disk recorder 32 in the reproducing mode and turns on the switches provided at the cross-points 62, 63 of the matrix switcher 50, to thereby supply the first and second video signals reproduced from the VTRS 30, 31 to the first mixer/effector circuit 51. The first mixer/effector circuit 51 switches the first and second video signal so as to achieve a wipe effect and supplies the switched video signal to the input terminal 59 of the matrix switcher 50. When the cross-point 65 is turned on, the third video signal reproduced from the disk recorder 32 is supplied to the DME 35, and the DME 35 processes the third video signal supplied thereto in an image deforming processing fashion. The DME 35 supplies the third video signal thus processed to the input terminal 61 of the matrix switcher 50. Then, the output signal of the first mixer/effector circuit 51 and the output signal of the DME 5 are respectively supplied to one input terminal and the other input terminal of the second mixer/effector circuit 52 by turning on the switches provided at the cross-points 64, 66. A keying signal that is used to mix the output signal of the DME 35 to the output signal of the first mixer/effector circuit 51 is supplied from the DME 35 to the second mixer/effector circuit 52. Then, while watching the monitor 68, the user inputs the video clip command signal through the keyboard 26 when the video frame data which are suitable as the in-point and the out-point are outputted from the second mixer/effector circuit 52. Just then, the control apparatus 20 controls the matrix switcher 50 such that the video frame data obtained at that time are supplied to the capture controller and memory 36 through the cross-point 72 of the matrix switcher 50. Also, the control apparatus 20 controls the capture controller and memory 36 such that the capture controller and memory 36 memorizes the video frame data. The video frame data representing the in-point and the out-point memorized in the capture controller and memory 36 are displayed by the monitor 37 in the forms shown by "5115" in FIG. 12. The control apparatus 20 is supplied with time codes through the control lines from the VTRs 30, 31 and the disk recorder 32 and permits the video frame data shown by "5115" in FIG. 12, i.e., time codes corresponding to the in-point and the out-point, to be stored in the RAM 23.

The aforesaid operation is repeated until the in-point and the out-point set on the first video signal inputted to one input terminal of the first mixer/effector circuit 51, the in-point and the out-point set on the second video signal inputted to the other input terminal of the first mixer/effector circuit 51, the in-point and the out-point set on the third video signal inputted to the DME 35 and the in-point and the out-point set to the output signal of the second mixer/effector circuit 52 reach desired points. After the above respective in-points and out-points reached desired points, the control apparatus 20 reads time code data representing respective cues from the RAM 23 and controls operation of the VTRs 30, 31, the disk recorder 32, the first mixer/effector circuit 51 and the second mixer/effector circuit 52 so that only the output video signal representing an image ranging from the in-point to the out-point shown in FIG. 12 and in which the first and second images are switched by the video frame data shown by OV2 and IV3 in FIG. 11 between the in-point and the out-point and in which the video signal between the video frames shown by IV1 and OV1 in FIG. 11 is mixed to the first or second video signal by the keying is recorded by the VTR 67, and then the editing is ended.

As described above, according to the present invention, since the video frame data representing the in-points and the out-points that were respectively set on the video signals reproduced by the VTRs 30, 31 and the disk recorder 32 and the video signal outputted from the second mixer/effector circuit 52 are displayed by the monitor 68, cues used upon editing can be set with ease from a visual sense standpoint. Further, since the video frame data representing the in-points and the out-points that were set to the first, second and third video signals reproduced by the VTRs 30, 31 and the disk recorder 32 are displayed along the time axis, a time relationship among the video frame data can be understood more easily. Furthermore, since the time code values corresponding to the video frame data are displayed adjacent to the video frame data, a time relationship among the video frame data can be understood more easily.

Figure 10:
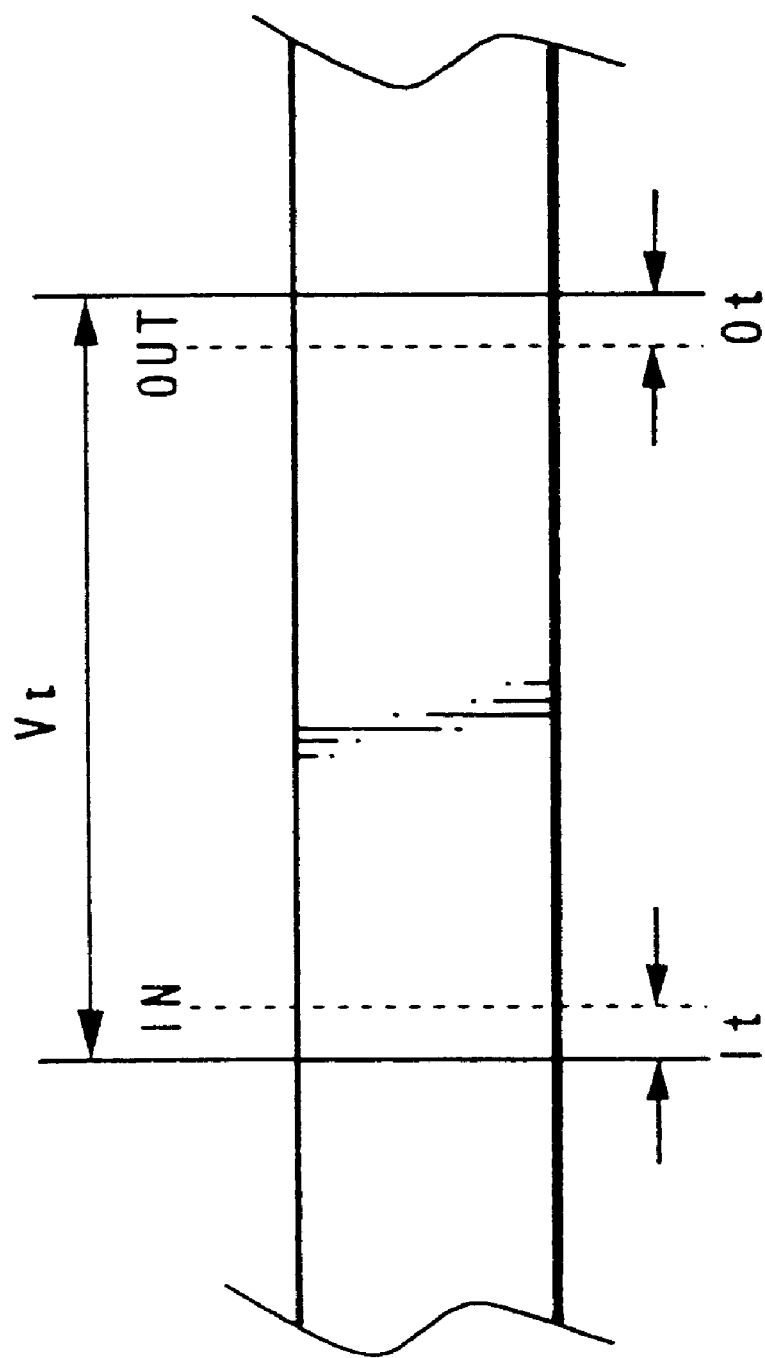
FIG. 10 is a schematic diagram used to explain operation of the editing apparatus shown in FIG. 3.

As shown in FIG. 10, when the in-point IN of the material Va or Vb is designated, image data obtained at a timing point a little before (on the time axis) the in-point IN can be memorized in the capture controller and memory 36 through the cross-points 70 to 73. When on the other hand the out-point OUT of the material Va or Vb is designated, image data obtained at a timing point delayed (on the time axis) from the out-point OUT can be memorized in the capture controller and memory 36 through the cross-points 70 to 73. At that time, time code data corresponding to respective video signals are supplied from the VTRs 30, 31 and the disk recorders 32, 33 through the control lines to the control apparatus 20 and then memorized in the RAM 23.

In FIG. 10, reference symbol It represents an offset amount obtained at the in-point IN and reference symbol Ot represents an offset amount obtained at the out-point OUT. Therefore, image data is memorized in the capture controller and memory 36 during a period Vt whose duration is longer than that of the period that was designated in actual practice.

The in-point IN and the out-point OUT also can be determined by using the edit files EDL1 through EDLn and the corresponding setup files SET1 through SETn. When the edit material Va or Vb is determined from the material to be reproduced by the VTR 30, for example, the VTR 30 is operated in the reproducing mode and image data is designated at the desired in-point IN and out-point OUT (i.e., mark-in and mark-out) as described above.

When the image data is designated at the desired in-point In and out-point OUT as described above (mark-in and mark-out), image data of the period Vt including the above offset amounts is memorized in the RAM 23 or the capture controller and the memory 36. Thereafter, the user permits the image data of the period Vt shown in FIG. 10 to be displayed on the display monitor 37, for example, by using the pointing device 25 or the keyboard 26.

Since the image data obtained at that time is not reproduced from the VTR 30 but is the data read out from the capture controller and memory 36, the user can accurately reproduce image data in a step-by-step playback fashion at a desired speed by using the pointing device 25 or the keyboard 26. Therefore, the user can determine the in-point IN and the out-point OUT at high speed over and over while repeatedly determining the in-point IN and the out-point OUT in the rehearsal mode.

When the material is recorded or memorized (buffered) in VTRs or disk recorders, the material including the offset amount may be recorded or memorized in VTRs or disk recorders automatically. With this arrangement, the user may determine the in-point IN and the out-point OUT one more time after step S33 (S43) of the flowchart shown in FIG. 9 was executed.

Figure 12:
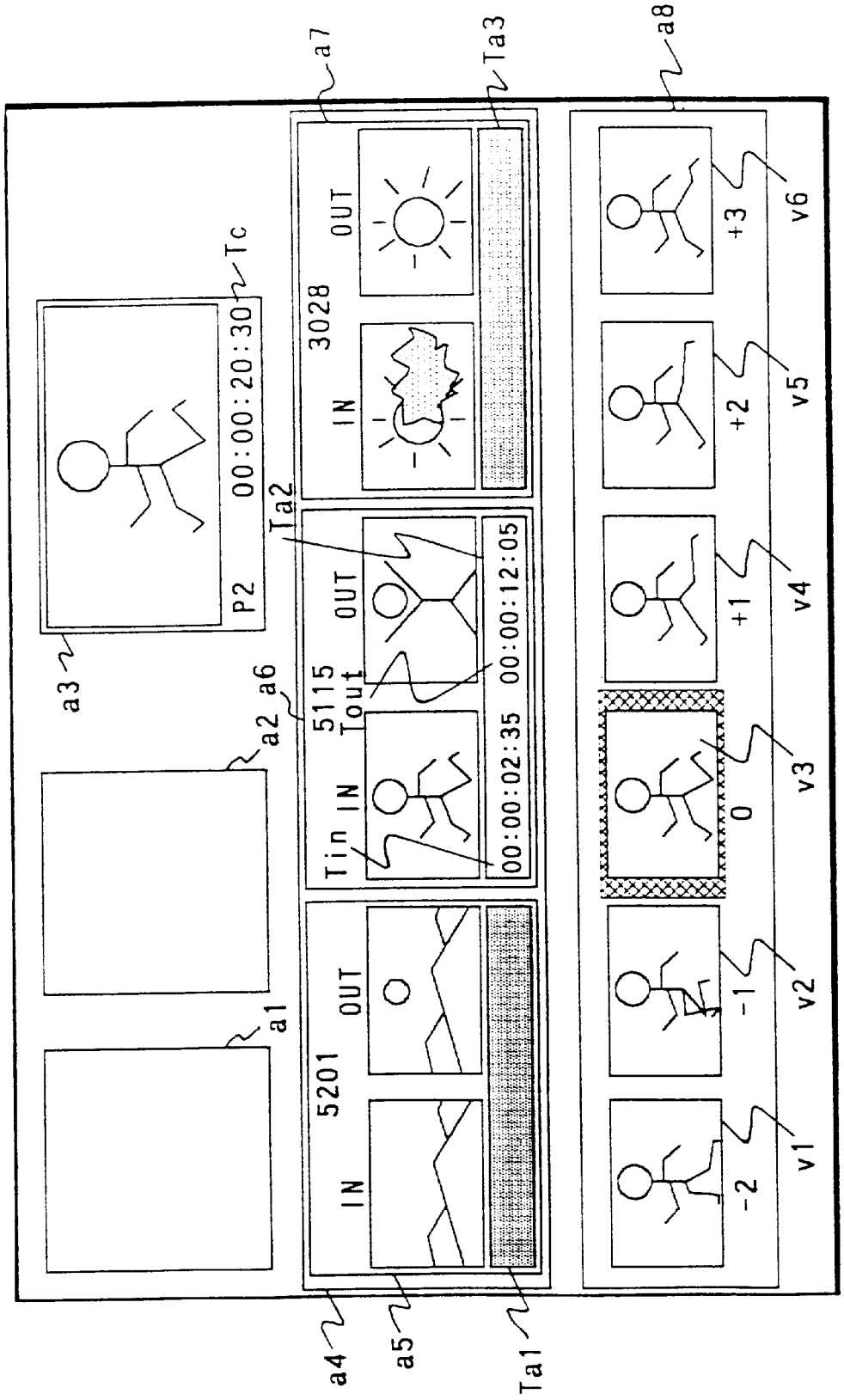
FIG. 12 is a schematic diagram used to explain display operation of video clips in the editing apparatus shown in FIG. 3.

With reference to FIG. 12, how to memorize image data including the offset amount and how to designate the in-point IN and the out-point OUT one more time as shown in FIG. 10 will be described together with images displayed on the picture screen of the monitor 37.

As shown in FIG. 12, time codes of every event are displayed on an area a1, and connected states of equipments and so on are displayed on an area a2.

Image data that is being previewed is displayed on an area a3. As will be clear from FIG. 12, when image data is displayed on the area a3, the image data is compressed by the capture controller and memory 36 shown in FIG. 3 and then displayed on the area a3. A number P2 that is assigned to the image displayed on the area a3 is displayed on the lower portion of the area a3 and a time code Tc also is displayed on the same lower portion.

Image data edited by the edit files EDL1 through EDLn, i.e., the materials Va, Vb in this embodiment (in this case, three edit materials (at the edit unit) are displayed) are respectively displayed on an area a4. In this embodiment, images obtained at in-points IN and images obtained at out-points OUT of the respective edit materials (shown by "5201", "5115", "3028", respectively) are displayed on the area a4. Furthermore, the areas a5 to a7 of the respective edit materials include time code display areas Ta1 to Ta3 for displaying thereon time codes.

Of the above three edit materials, a time code Tin of the in-point IN and a time code Tout of the out-point OUT are displayed only in the time code display area Ta2 of the edit material displayed on the area a6.

This means that the editing is now performed, i.e., the in-point IN and the out-point OUT are now being designated one more time. As described above, when the edit material is designated, image data is memorized under the condition that the offset amount (or offset amount of several seconds before and after the in-point IN and the out-point OUT) is added to the in-point IN and the out-point OUT designated in actual practice by the mark-in and mark-out.

As shown in FIG. 12, memorized image data of the in-point IN and the out-point OUT (in this embodiment, images of the in-point IN) together with the offset amount are displayed on an area a8. This example shown in FIG. 12 illustrates that the edit material at the in-point IN is edited, and also illustrates image data v1 through v6 obtained before and after the in-point IN. Numerical values ranging from −2 to +3 shown under the respective image data v1 through v6 are indexes that can teach the order of the respective image data v1 through v6 from a time standpoint where the in-point IN thus memorized (marked-in) is assumed to be "0".

Only the image data v3 is shown hatched in FIG. 12 because the image data v3 is image data thus memorized (marked-in). The user, however, can select (referred to as a recalling) desired image data from the image data v1 through v6 (image data v1 and v6 are headed and followed by other image data in actual practice, though not shown) by using some suitable means, such as the pointing device 25, a cursor key of the keyboard 26 or the like. The selected one of the image data v1 through v6 is shown hatched in FIG. 12. Then, the user can change and determine the in-point IN by inputting data representing that the desired image data was selected. The keyboard 26 may include some independent keys for moving image data in the positive or reverse direction in a step-by-step picture fashion, such as an FS (forward space) key, a BS (back space) key or the like.

When the in-point IN and the out-point OUT are designated one more time, the user can select the editing of the in-point IN or the out-point OUT by clicking the pointing device 25 or by operating the return key of the keyboard 26 at the position of the cursor after the user moved the cursor to the area of the in-point IN or the out-point OUT of desired one of the image data of the area a5 to a7.

According to this embodiment, when the in-point IN and the out-point OUT are temporarily determined by the above-mentioned mark-in and mark-out, image data obtained before and after the in-point IN and the out-point OUT thus temporarily designated are memorized in the capture controller and memory 36. Then, the image data obtained before and after the in-point IN and the out-point OUT thus temporarily designated are compressed and displayed on the monitor 37 so that the user can designate the in-point IN and the out-point OUT on the picture screen of the monitor 37 one more time by using the pointing device 25 or the keyboard 26. Therefore, a frequency with which the VTRs 30, 31 are used can be reduced, and the editing apparatus becomes easier to handle and the user can edit image data with high accuracy.

How to delete, position-exchange, copy and move edit data of the edit files EDL1 through EDLn will be described with reference to FIG. 13. In FIG. 13, image data displayed on the monitor 37 will be referred to similarly to FIG. 12, and like parts corresponding to those of FIG. 11 are marked with the same references and therefore need not be described in detail.

As shown in FIG. 13, leading image data P1 through P6 of the edit files EDL1 through EDLn are displayed on an area a9. At that time, image data obtained at the in-point IN and the out-point OUT of the edit data are respectively displayed on the areas a5 through a7 of the area a4 located at the lower portion of the area a9 similarly to FIG. 12.

The reason that the time codes Tin and Tout are displayed on the time code area Ta2 of only the area a6 is that the user had already selected the area a6 of the area a4 by the pointing device 25 or the keyboard 26.

According to this embodiment, edit data of one of the selected areas a5 through a7 can be deleted, copied, moved and exchanged in position by directly selecting one of the areas a5 through a7. When the user wants to delete edit data, the user can delete desired edit data by clicking the area of desired edit data by using the pointing device 25 or by operating the return key of the keyboard 26 at the position of the cursor after the user moved the cursor to one of the areas a5 through a7 of the desired edit data to be deleted.

When the user wants to copy edit data, the user moves the cursor or the like to one of the areas a5 through a7 of the desired edit data to be copied, clicks the area of the desired edit data by using the pointing device 25 and moves the cursor (or pointer) to the desired one of the areas a5 to a7 under the condition that the user keeps clicking the pointing device 25 and then releases the pointing device 25 from being clicked within the areas a5 to a7, thereby the desired edit data is copied.

When the user wants to move edit data, the user moves the cursor or the like to one of the areas a5 to a7 of desired edit data to be moved, clicks the selected area of the desired edit data by using the pointing device 25 and moves the cursor (or pointer) to the desired one of the areas a5 to a7 under the condition that the user keeps clicking the pointing device 25 and releases the pointing device 25 from being clicked within the areas a5 to a7, thereby edit data is moved.

When the user wants to exchange edit data in position, the user moves the cursor to one of the areas a5 to a7 of desired one edit data and clicks the selected area of the desired edit data by using the pointing device 25 at the position of the cursor. Thereafter, the user moves the cursor to the desired one of the areas a5 to a7 and clicks the desired one of the areas a5 to a7 by using the pointing device 25 or the like, thereby the edit data is exchanged in position.

From an internal processing standpoint, when "delete" is effected, corresponding areas of the capture controller and memory 36 are deleted simply and also data associated with corresponding edit data of the edit files EDL1 through EDLn are deleted.

When edit data is copied, edit data of the corresponding areas of the capture controller and memory 36 are stored in the designated area one more time, and data associated with corresponding edit data of the edit files EDL1 through EDLn are written in a memory area corresponding to an area in which edit data is to be copied.

When edit data is moved, edit data of the corresponding areas of the capture controller and memory 36 are stored in the designated area one more time, and data associated with corresponding edit data of the edit files EDL1 through EDLn are written in a memory area corresponding to an area in which edit data is to be moved.

When edit data is exchanged in position, two edit data of the corresponding area of the capture controller and memory 36 are stored in their areas one more time, and data associated with the two edit data corresponding to the edit files EDL1 through EDLn are written in their memory areas.

The user can temporarily confirm various processings, such as "delete", "copy", "move", "position exchange" or the like by changing the contents of data stored in the memory (not shown) of the capture controller and memory 36, and then change the contents of the edit files EDL1 through EDLn in actual practice.

As described above, according to the embodiment of the present invention, since the user can change the contents of the edit files EDL1 through EDLn by deleting, copying, moving and position-exchanging image data of the edit unit displayed on the picture screen by means of the pointing device 25 or the keyboard 26, the user can edit image data without being annoyed by a cumbersome job, such as of reviewing the in-point and the out-point by operating the VTRs 30, 31 in the playback mode, confirming and inputting the memory address by the keyboard 26 or the like. Therefore, an efficiency in editing can be improved.

How to display on a time axis transition points obtained when various video special effects are achieved by various equipments shown in FIG. 3 will be described with reference to FIG. 11.

As shown in FIG. 11, time codes of the recording recorders, e.g., the VTRs 30, 31 and the disk recorders 32, 33 are described on the leftmost portion of the diagram. As shown in FIG. 11, time codes have markers Ma affixed thereto, and lines are extended from the markers Ma in order to indicate a time. A DME column and switcher columns also are provided from the time code column leftwardly, in that order. First and last image data of image data that are processed in time periods indicated by the time codes are illustrated in the respective columns. Specifically, image data Iv1 and Ov1 are displayed on the DME column in accordance with the time codes, image data Iv2, Ov2 are displayed on the switcher column in accordance with the time codes, and image data Iv3, Ov3 are displayed on another switcher column in accordance with the time codes.

Time bars b1, b2 and b3 representing time periods of image data are displayed on the left of the image data Iv1, Ov1, Iv2, Ov2 and Iv3, Ov3, respectively. As shown in FIG. 11, the transition points of the processing done by various equipments shown in FIG. 3 are represented by the time codes and the markers Ma. Also, the image data Iv1, Ov1, Iv2, Ov2, Iv3, Ov3 of the transition points are illustrated on the columns of the processing equipment. Furthermore, the time bars b1, b2 and b3 representing the duration of the image data are displayed on the left-hand side. Therefore, the user can visually understand the situation that the editing apparatus is placed, such as when the editing apparatus is in use or the like.

The display shown in FIG. 11 may be carried out by designating the in-point and the out-point during the time the edit files EDL1 through EDLn are executed. Alternatively, the display may be carried out at the same time when the edit files EDL1 through EDLn are executed.

When the monitor 37 displays the above-mentioned time codes and image data, information representing the editing processing executed with the edit files EDL1 through EDLn is transmitted to the capture controller and memory 36 every moment. On the basis of the information supplied thereto, the capture controller and memory 36 memorizes the time code, the marker Ma, the bar graph b1, the image data Iv1, Ov1, Iv2, Ov2, Iv3, Ov3 in the memory thereof and reads them out therefrom and supplies them to the monitor 37.

According to the embodiment of the present invention, since the processing state that was executed can be displayed so as to be easy to see together with the image data, efficiency in the editing can be improved considerably.

Since a time of each effect is reflected in real time on the control apparatus 20 when changed, the user can confirm other effects which should follow. Further, if the user knows in advance a relationship of effects which should follow, then the user can automatically link the effects in such relationship by registering that relationship from the picture.

According to the embodiment of the present invention, since the user can change the contents of the edit files EDL1 through EDLn by deleting, copying, moving and position-exchanging image data displayed on the picture screen at the unit of the edit files, the user can carry out the editing without being annoyed by a cumbersome job, such as reviewing image data by operating the VTRs 30, 31 in the playback mode, confirming and inputting the memory address by the keyboard 26 or the like. Therefore, an efficiency in the editing can be improved.

According to the present invention, since the display means displays the first and second points of image data provided as the predetermined unit, the designating means designates the image of the first and second points of the predetermined unit displayed on the display means and control means displays the time code data of the image data of the first or second point designated by the designating means, the conditions of related equipments and the identification numbers, the efficiency in the editing can be improved and therefore the editing apparatus becomes easier to handle.

Further, according to the present invention, since the designating means moves the image data of the first and second points displayed on the display means along the time axis, copies the same to other time position and deletes the same, the user can carry out the editing more easily with the above-mentioned effects being achieved.

Furthermore, according to the present invention, since the displayed conditions of the first and second designated image data are changed when the image data of the first and second points displayed on the display means are designated by the designating means, the editing becomes more understandable and easier with the above-mentioned effects also being achieved.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An editing apparatus for forming an output video signal by editing a plurality of video signals, comprising:

processing means for obtaining said output video signal by effecting a video special effect processing on first and second input video signals fed thereto;

reproducing means for providing said first and second input video signals;

a control unit including user input means for receiving selections and/or instructions from a user, said selections including video special effects to be processed by said processing means, said control unit outputting commands for implementing said selections and/or instructions from said user;

video clip generating means responsive to commands from said control unit for generating a first video clip including a first picture frame representing a starting position and a second video clip including a second picture frame representing an ending position of said first input video signal, a third video clip including a third picture frame representing a starting position and a fourth video clip including a fourth picture frame representing an ending position of said second input video signal, and a fifth video clip including a fifth picture frame representing a starting position and a sixth video clip including a sixth picture frame representing an ending position of said output video signal;

recording means for recording said output video signal;

memory means for memorizing any video signal fed thereto; and display means for displaying said first, second, third, and fourth picture frames on the basis of time information attached respectively to each said video clip by said video clip generating means so as to express a positional relationship of said first, second, third, and fourth picture frames on a time axis, and said display means displaying said fifth and sixth picture frames, concurrently with said first, second, third, and fourth picture frames on a single monitor of said display means, wherein said control unit controls said recording means, said display means, and said memory means, said control unit controls said reproducing means such that, when said first and second input video signals are recorded on a same recording medium, said second input video signal is initially memorized in said memory means and said first and second input video signals are supplied respectively from said reproducing means and said memory means to said processing means, said control unit includes a memory for storing a plurality of edit information and a plurality of setup information, and said control unit reads setup information corresponding to one of said plurality of edit information read out from said memory and sets up said processing means, said reproducing means, said recording means, said display means, and said memory means on the basis of said setup information.

2. The editing apparatus according to claim 1, wherein said video special effect processing is a cut processing for selectively outputting said first and second input video signals.

3. The editing apparatus according to claim 1, wherein said video special effect processing is a processing for generating a wipe effect from said first and second input video signals.

4. The editing apparatus according to claim 1, wherein said video special effect processing is a processing for generating a mix effect from said first and second input video signals.

5. The editing apparatus according to claim 1, wherein said video special effect processing is a processing for generating a fade effect from said first and second input video signals.

6. The editing apparatus according to claim 1, wherein said display means further displays time code information included in said first, second, third, fourth, fifth and sixth video clips at positions corresponding respectively to display positions of said first, second, third, fourth, fifth and sixth picture frames.

* * * * *